(12) United States Patent
De Lind Van Wijngaarden et al.

(10) Patent No.: US 9,673,860 B2
(45) Date of Patent: Jun. 6, 2017

(54) METHOD AND APPARATUS FOR FAST AND ACCURATE ACQUISITION OF CROSSTALK COEFFICIENTS

(71) Applicant: ALCATEL LUCENT, Paris (FR)

(72) Inventors: Adriaan De Lind Van Wijngaarden, Union, NJ (US); Mamoun Guenach, Machelen (BE); Carl J. Nuzman, Union, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 8 days.

(21) Appl. No.: 14/409,966

(22) PCT Filed: Jul. 18, 2013

(86) PCT No.: PCT/EP2013/065186
§ 371 (c)(1),
(2) Date: Dec. 19, 2014

(87) PCT Pub. No.: WO2014/013018
PCT Pub. Date: Jan. 23, 2014

(65) Prior Publication Data
US 2015/0195005 A1    Jul. 9, 2015

(30) Foreign Application Priority Data
Jul. 20, 2012  (EP) .................................... 12305887

(51) Int. Cl.
*H04B 3/32*    (2006.01)
*H04M 3/30*    (2006.01)
(Continued)

(52) U.S. Cl.
CPC .............. *H04B 3/32* (2013.01); *H04B 3/487* (2015.01); *H04M 3/302* (2013.01); *H04M 3/34* (2013.01);
(Continued)

(58) Field of Classification Search
None
See application file for complete search history.

(56) References Cited

U.S. PATENT DOCUMENTS

2009/0116582 A1    5/2009  Ashikhmin et al.
2009/0310502 A1*  12/2009  Nuzman ................. H04B 3/32
                                                   370/252

(Continued)

FOREIGN PATENT DOCUMENTS

CN    101843000 A     9/2010
EP     2136477 A1    12/2009

OTHER PUBLICATIONS

International Search Report PCT/ISA/210 for International Application No. PCT/EP2013/065186 Dated Sep. 5, 2013.

*Primary Examiner* — Huy D Vu
*Assistant Examiner* — James P Duffy
(74) *Attorney, Agent, or Firm* — Harness, Dickey & Pierce, P.L.C.

(57) ABSTRACT

In accordance with an embodiment, the method includes inserting a plurality of crosstalk probing signals within the wired multi-carrier communication system for probing the crosstalk from respective ones of the plurality of disturber lines into the victim line, carrying out crosstalk measurements over the victim line, and estimating the crosstalk coefficients from the crosstalk measurements. The method further includes organizing the plurality of disturber lines into subsets of disturber lines, and individually assigning disjoint groups of carriers to the respective subsets of disturber lines. The insertion of the plurality of crosstalk probing signals is confined within the respectively assigned groups of carriers. The subsets of disturber lines and/or the groups of carriers used for a second or subsequent iteration
(Continued)

are tailored based on crosstalk characteristics observed for the respective disturber lines during a pervious iteration.

14 Claims, 5 Drawing Sheets

(51) Int. Cl.
    *H04M 3/34*     (2006.01)
    *H04B 3/487*     (2015.01)
    *H04L 27/26*     (2006.01)
    *H04L 25/03*     (2006.01)

(52) U.S. Cl.
    CPC   *H04L 27/2613* (2013.01); *H04L 2025/03426* (2013.01)

(56) References Cited

U.S. PATENT DOCUMENTS

2011/0110409 A1     5/2011   Sands et al.
2014/0219074 A1*   8/2014   Lu .......................... H04B 3/32
                                                       370/201

* cited by examiner

METHOD AND APPARATUS FOR FAST AND ACCURATE ACQUISITION OF CROSSTALK COEFFICIENTS

TECHNICAL FIELD OF THE INVENTION

The present invention relates to a method and apparatus for fast and accurate acquisition of crosstalk coefficients in a wired multi-carrier or multi-tone communication system.

TECHNICAL BACKGROUND OF THE INVENTION

Crosstalk (or inter-channel interference) is a major source of channel impairment for Multiple Input Multiple Output (MIMO) communication systems, such as Digital Subscriber Line (DSL) communication systems.

As the demand for higher data rates increases, DSL systems are evolving toward higher frequency bands, wherein crosstalk between neighboring transmission lines (that is to say, transmission lines that are in close vicinity such as twisted copper pairs in a cable binder) is more pronounced (the higher frequency, the more coupling).

A MIMO system can be described by the following linear model:

$$Y(k)=H(k)X(k)+Z(k) \quad (1)$$

wherein the N-component complex vector X, respectively Y, denotes a discrete frequency representation, as a function of the frequency/carrier/tone index k, of the symbols transmitted over, respectively received from, the N channels,
wherein the N×N complex matrix H is referred to as the channel matrix: the (i,j)-th component of the channel matrix H describes how the communication system produces a signal on the i-th channel output in response to a symbol being transmitted to the j-th channel input; the diagonal elements of the channel matrix describe direct channel coupling, and the off-diagonal elements of the channel matrix describe inter-channel coupling (also referred to as crosstalk coefficients),
and wherein the N-component complex vector Z denotes additive noise over the N channels, such as Radio Frequency Interference (RFI), thermal noise and alien interference.

Different strategies have been developed to mitigate crosstalk and to maximize effective throughput, reach and line stability. These techniques are gradually evolving from static or dynamic spectral management techniques to multi-user signal coordination (or vectoring).

One technique for reducing inter-channel interference is joint signal precoding: the transmit data symbols are jointly passed through a precoder before being transmitted over the respective communication channels. The precoder is such that the concatenation of the precoder and the communication channel results in little or no interference at the receiver. Typically, the precoder performs a matrix-product of a row-vector of frequency samples to be jointly transmitted over multiple channels with a precoding matrix so as to compensate for an estimate of the coming crosstalk.

A further technique for reducing inter-channel interference is joint signal post-processing: the received data symbols are jointly passed through a postcoder before being detected. The postcoder is such that the concatenation of the communication channel and the postcoder results in little or no interference at the receiver. Typically, the postcoder performs a matrix-product of a row-vector of frequency samples jointly received from multiple channels with a crosstalk cancellation matrix so as to cancel an estimate of the incurred crosstalk.

Signal precoding is particularly suited for downstream communication (toward customer premises), while signal post-processing is particularly suited for upstream communication (from customer premises). Either technique is often referred to as signal vectoring.

Signal vectoring is typically performed at a traffic aggregation point, where all the data symbols concurrently transmitted over, or received from, multiple communication channels are available. For instance, signal vectoring is advantageously performed within a Digital Subscriber Line Access Multiplexer (DSLAM).

The choice of the vectoring group, that is to say the set of communication lines, the signal s of which are jointly processed, is rather critical for achieving good crosstalk cancellation performances. Within a vectoring group, each communication line is considered as a disturbing line inducing crosstalk into the other communication lines of the group, and the same communication line is considered as a victim line receiving crosstalk from the other communication lines of the group. Crosstalk from lines that do not belong to the vectoring group is treated as alien noise and is not canceled.

Ideally, the vectoring group should match the whole set of communication lines that physically and noticeably interact with each other. Yet, local loop unbundling on account of national regulation policies and/or limited vectoring capabilities may prevent such an exhaustive approach, in which case the vectoring group would include a sub-set only of all the physically interacting lines, thereby yielding limited crosstalk cancellation performances.

The performance of signal vectoring depends critically on the component values of the precoding or cancellation matrix, which component values are to be computed and updated according to the actual and varying crosstalk couplings.

A prior art method for estimating the crosstalk coefficients comprises the steps of:
  simultaneously transmitting a plurality of mutually orthogonal crosstalk pilot sequences through respective ones of a plurality of disturber channels,
  measuring errors induced over a victim channel while the pilot sequences are being transmitted,
  correlating the error measurements with respective ones of the plurality of crosstalk pilot sequences, thereby yielding a plurality of correlated error measurements,
  estimating the crosstalk coefficients from the plurality of disturber channels into the victim channel based on respective ones of the plurality of correlated error measurements.

That is, transceiver units send downstream or upstream pilot sequences. Error samples, measuring both interference and noise over the victim channel, are fed back to a vectoring controller. The error samples are correlated with a given pilot sequence in order to obtain the crosstalk contribution from a specific line. To reject the crosstalk contribution from the other lines, the pilot sequences are made orthogonal, for instance by using Walsh-Hadamard sequences comprising '+1' and '−1' anti-phase symbols. The crosstalk estimates are used for updating the precoding or cancellation matrix. The process can be repeated as needed to obtain more and more accurate estimates.

This prior art method has been adopted by the International Telecommunication Union (ITU) for use with VDSL2 transceivers, and is described in the recommendation entitled "Self-FEXT Cancellation (vectoring) For Use with VDSL2 Transceivers", ref. G.993.5 (04/2010).

In this recommendation, the pilot signals are sent on the so-called SYNC symbols, which occur periodically after every 256 DATA symbols.

On a given disturber line, a representative subset of the active carriers (or tones) of the SYNC symbol are 4-QAM modulated by the same pilot digit from a given orthogonal pilot sequence, and thus all transmit one of two complex constellation points, either '1+j' corresponding to '+1', or '−1−j' corresponding to '−1'. The remaining carriers of the SYNC symbol keeps on carrying the typical SYNC-FLAG for On-Line Reconfiguration (OLR) message acknowledgment.

On a given victim line, error samples, which comprise both the real and imaginary part of the slicer error on a per tone or group-of-tones basis, quantized with a certain number of bits (typically 16), are measured and reported for a specific SYNC symbol to the vectoring controller for further crosstalk estimation.

In G.993.5, it is further assumed that the access node transmits and receives the SYNC symbols over the vectored lines synchronously (super frame alignment) so as pilot signal transmission and interference measurements are carried out synchronously over the respective transmission lines.

Also, a joining line confines transmission to SYNC symbols only during a preliminary initialization phase (O-P-VECTOR1) so as not to impair the communication over the active lines (no data is being transmitted during the SYNC symbols), yet to allow the system to acquire the crosstalk coefficients, and to cancel the crosstalk, from that new joining line towards the already active lines. Then, the joining line can switch to full transmission once the crosstalk coefficients from that new joining line have been determined and the precoder and postcoder have been updated to mitigate the crosstalk from that new joining line.

A further prior art method for estimating the crosstalk coefficients is described in Appendix III of ITU G.993.5 recommendation, and is particularly suited for legacy Customer Premises Equipment (CPE).

The method comprises the steps of superimposing a crosstalk probing signal over the victim line while measuring signal to Noise and Interference Ratio (SNIR) over that victim line, and estimating the crosstalk coefficients from these SNIR measurements.

The probing signals consists of a complex-weighted sum of regular data signals transmitted over the respective disturber lines. Three successive SNIR measurement rounds with three distinct complex weight values are required so as to estimate both the amplitude and phase of the crosstalk coefficients from a given disturber line.

The basic SNIR method uses successive perturbations on the victim lines, followed by successive cancellation. Due to slow reporting times of SNIR measurements of up to 10 seconds per measurement round, the overall time needed to acquire the crosstalk coefficients for a joining legacy line in a scenario where many lines are active, is significant (e.g., for 48 lines one iteration may take about 24 minutes, and multiple iterations are generally needed to obtain accurate estimates).

A solution is sought to rapidly acquire the crosstalk coefficients in a DSL communication system, in particular for situations where vectoring-compliant and legacy Customer Premises Equipment (CPEs) co-exist, and where one or more activating (or initializing) lines join a large number of active lines. It is essential to quickly attain vectored performance for both vectoring-compliant and legacy CPEs.

More generally, we are concerned with fast and accurate acquisition of crosstalk coefficients in a wired multi-carrier communication system from a set of disturber lines into a victim line.

SUMMARY OF THE INVENTION

It is an object of the present invention to suppress or to mitigate the aforementioned shortcomings and drawbacks of the prior art.

In accordance with a first aspect of the invention, a method for acquiring crosstalk coefficients from a plurality of disturber lines into a victim line in a wired multi-carrier communication system, iterates through the steps of inserting a plurality of crosstalk probing signals within the wired multi-carrier communication system for probing the crosstalk from respective ones of the plurality of disturber lines into the victim line, carrying out crosstalk measurements over the victim line, and estimating the crosstalk coefficients from the crosstalk measurements. The method iterates through the further steps of organizing the plurality of disturber lines into subsets of disturber lines, and individually assigning disjoint groups of carriers to the respective subsets of disturber lines. The insertion of the plurality of crosstalk probing signals is confined within the respectively assigned groups of carriers. The subsets of disturber lines and/or the groups of carriers used for a second or subsequent iteration are tailored based on crosstalk characteristics observed for the respective disturber lines during a previous iteration.

In accordance with another aspect of the invention, a vectoring controller for acquiring crosstalk coefficients from a plurality of disturber lines into a victim line in a wired multi-carrier communication system is configured to iterate through the steps of inserting a plurality of crosstalk probing signals for probing the crosstalk from respective ones of the plurality of disturber lines into the victim line, receiving crosstalk measurements carried out over the victim line, and estimating the crosstalk coefficients from the crosstalk measurements. The vectoring controller is further configured to iterate through the further steps of organizing the plurality of disturber lines into subsets of disturber lines, and individually assigning disjoint groups of carriers to the respective subsets of disturber lines. The vectoring controller is further configured to confine the insertion of the plurality of crosstalk probing signals within the respectively assigned groups of carriers, and to tailor the subsets of disturber lines and/or the groups of carriers used for a second or subsequent iteration based on crosstalk characteristics observed for the respective disturber lines during a previous iteration.

The vectoring controller may form part of a Digital Subscriber Line Access Multiplexer (DSLAM), or more generally of any access node providing wired communication access to subscribers over a loop plant, such as an Ethernet bridge, an edge router, etc. The access node may reside at a central location (e.g., at a central office), or at a fiber-fed remote location closer to subscriber premises (e.g., fiber-to-the-curb or fiber-to-the-cabinet architecture).

In one embodiment of the invention, the observed crosstalk characteristics are indicative of the frequency coherence of the respective crosstalk channels.

In one embodiment of the invention, the observed crosstalk characteristics are indicative of the amounts of nominal crosstalk incurred from the respective disturber lines.

In one embodiment of the invention, the observed crosstalk characteristics are indicative of the amounts of residual crosstalk incurred from the respective disturber lines that remain uncompensated over the victim line.

In one embodiment of the invention, the subsets of disturber lines are assigned interleaved carrier groups with respective decimation factors, and the decimation factors used for a first iteration are substantially greater than a typical frequency coherence of a typical crosstalk channel.

In one embodiment of the invention, the subsets of disturber lines individually comprise one or more disturber lines.

In one embodiment of the invention, the step of estimating particular crosstalk coefficients from a particular disturber line into the victim line comprises the steps of obtaining particular crosstalk measurements carried out over the victim line at particular frequency indexes of a particular carrier group assigned to a particular subset of disturber lines which the particular disturber line belongs to, estimating the particular crosstalk coefficients at the particular frequency indexes from the particular crosstalk measurements, and determining the remaining particular crosstalk coefficients at the remaining frequency indexes by means of interpolation.

In one embodiment of the invention, the crosstalk measurements are SNIR measurements.

In one embodiment of the invention, the plurality of crosstalk probing signals are weighted replicas of a plurality of regular signals transmitted over, or received from, respective ones of the plurality of disturber lines, and the plurality of crosstalk probing signals are combined as a single crosstalk probing signal superimposed over a further regular signal transmitted over, or received from, the victim line.

In one embodiment of the invention, the plurality of crosstalk probing signals are weighted replicas of a regular signal transmitted over, or received from, the victim line, and the plurality of crosstalk probing signals are superimposed over respective ones of a plurality of further regular signals transmitted over, or received from, respective ones of the plurality of disturber lines.

In one embodiment of the invention, the crosstalk measurements are slicer error measurements.

In one embodiment of the invention, the plurality of probing signals are obtained by modulating the carriers of the respective carrier groups with orthogonal probing sequences, and the plurality of probing signals are synchronously transmitted over respective ones of the plurality of disturber lines during dedicated transmission slots.

Embodiments of a method according to the invention correspond with the embodiments of a vectoring controller according to the invention.

The proposed crosstalk channel estimation mechanism selects disjoint subsets of tones and uses crosstalk measurements to determine crosstalk from multiple disturbers simultaneously. The measurements are then used to determine the relative strength and smoothness of the crosstalk channel, and to select disjoint subsets of tones for the next measurement round. Interpolation and denoising of the measurements are used to iteratively improve the crosstalk channel estimates.

A first measurement on the selected tones for multiple lines provides information on the relative strength and smoothness of the crosstalk channel in terms of their frequency coherence. Based on this information, new disjoint sets of tone groups are determined for further measurements, e.g. by reassigning the existing sets to other disturber lines and simultaneously estimating the crosstalk coefficient values for the new sets of measurements. If there is a significant variation in the strength of the crosstalk coefficients, more measurement points can be allocated to the lines that cause more crosstalk into the victim lines at the expense of the number of measurement points for lines that cause less, or an easy to predict amount of crosstalk. In addition, the algorithm can estimate a smoothness factor that measures the coherence of the crosstalk coefficients across frequency, based on which it can reduce the number of total measurements. During subsequent iterations, the difference between measured and predicted crosstalk values is used to determine new sets of measurement points.

It is shown that this strategy can reduce the channel acquisition time significantly. Simulations confirm that the time required to attain a performance close to the single line performance can be reduced by an order of magnitude for smooth channels with sufficient frequency coherence across nearby tones.

The present invention provides a method to perform much faster crosstalk channel acquisition and faster convergence toward vectored performance. It is able to determine the relative strength of the crosstalk channels on the fly, and to concentrate measurements toward the most dominant disturber lines. A careful selection of measurement points as well as interpolation and denoising of the measurements lead to significant improvements in convergence speed, in particular for smooth crosstalk channels with sufficient frequency coherence across tones.

If knowledge about the strength and local variation of the crosstalk channels is known a priori, this can be exploited immediately by tailoring the measurements across the lines and tones to exploit frequency coherence across tones and to rapidly acquire the dominant crosstalk coefficients.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
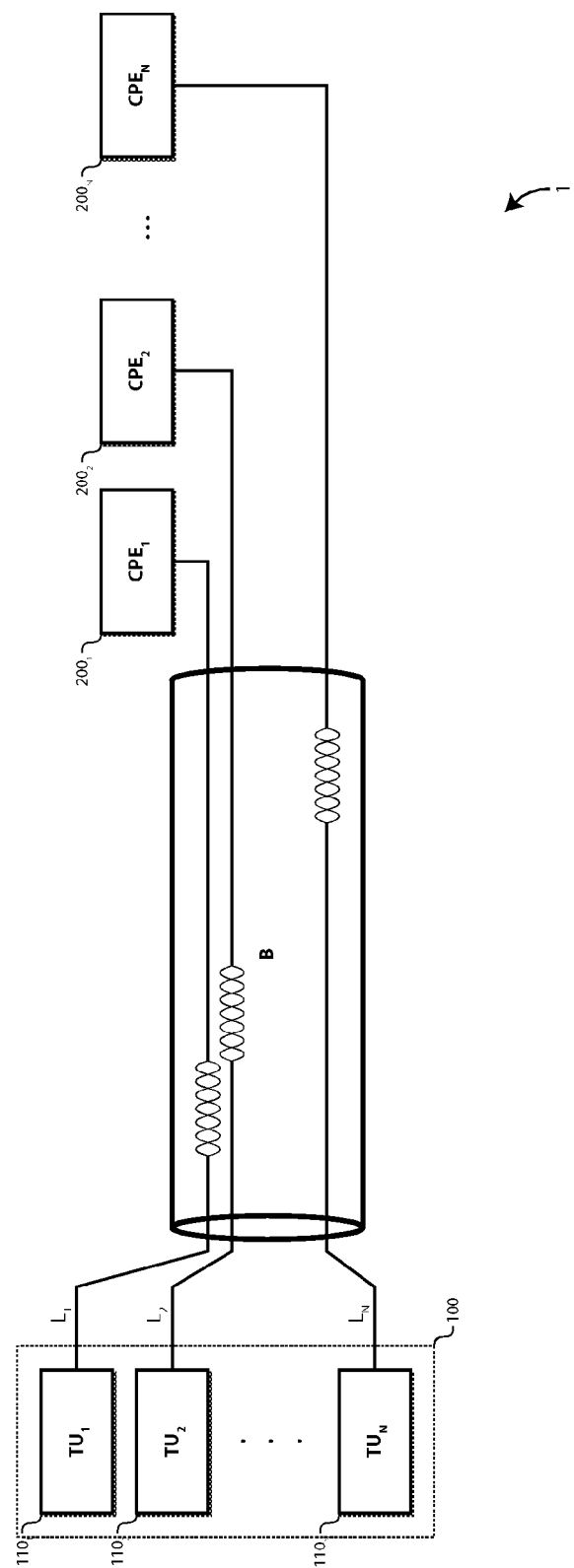
FIG. 1 represents an exemplary DSL communication system.

There is seen in FIG. 1 a DSL communication system 1 for providing broadband access to subscribers.

The DSL communication system 1 comprises a loop plant 300, a DSLAM 100 and N CPEs $200_1$ to $200_N$ (or $CPE_1$ to $CPE_N$). The DSLAM 100 comprises N transceivers $110_1$ to $110_N$ (or $TU_1$ to $TU_N$) coupled via N subscriber lines $L_1$ to $L_N$ to respective ones of the N CPEs $200_1$ to $200_N$. The subscriber lines $L_1$ to $L_N$ are for example Unshielded Twisted Pairs (UTP).

The subscriber lines $L_1$ to $L_N$ are bundled together within a common binder B, and induce crosstalk into each other as they are in close vicinity over whole or part of their length. The subscriber lines $L_1$ to $L_N$ are assumed to form part of the same vectoring group.

Because downstream and upstream communications are assigned different and non-overlapping frequency bands, a principle commonly referred to as Frequency Division Duplexing (FDD), crosstalk mostly reduces to Far-End Crosstalk (FEXT): some substantial amount of the signal transmitted by a transceiver (the disturber) couples into a neighboring line and impairs reception of the direct signal received over that neighboring line at a remote transceiver (the victim). For instance, the downstream signal transmitted by the transceiver $110_1$ over line $L_1$ couples into line $L_N$ and is detected as noise by the CPE $200_N$. Also, the upstream signal transmitted by the CPE $200_N$ over line $L_N$ couples into line $L_1$ and is detected as noise by the transceiver $110_1$.

Figure 2:
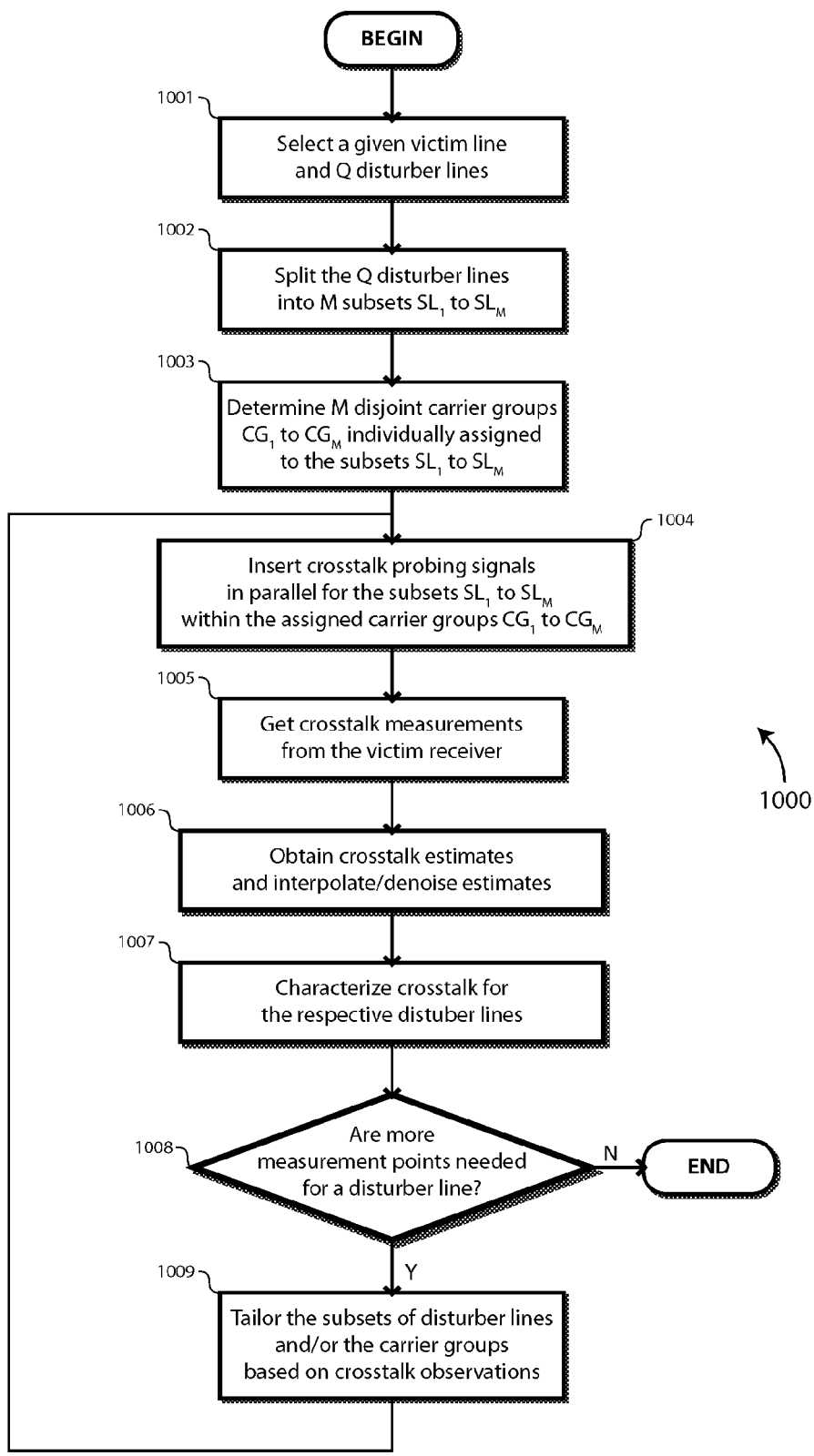
FIG. 2 represents a flow chart of a crosstalk acquisition algorithm as per the present invention.

FIG. 2 shows a flow chart of a crosstalk acquisition algorithm 1000 as per the present invention.

As aforementioned, there are a number of prior art methods for estimating the crosstalk coefficients from a plurality of disturber lines, say lines $L_1$ to $L_{N-1}$, into a victim line, say line $L_N$. The number of observations, and hence the time required, is proportional to N−1 (i.e., the number of disturber lines):

using pilot sequence of length at least N−1, one needs error samples error(f) from at least N−1 SYNC symbols;

using SNIR measurements with one disturber at a time, one needs one shared base plus two perturbed SNIR measurements per disturber line per iteration, i.e. 1+2·(N−1) measurements per iteration (or 3·(N−1) if using new base SNIR measurement for each disturber line); or using SNIR method with simultaneous perturbations for all disturber lines, one still needs 1+2·(N−1) to get a set of linearly-independent equations that can be solved.

The proposed crosstalk acquisition algorithm 1000 comprises the following steps.

In a first step 1001, select a given victim line, and Q disturber lines whose crosstalk towards the victim line needs to be characterized (Q≤N−1).

In a second step 1002, split the Q disturber lines into M subsets $SL_1$ to $SL_M$ (2≤M≤Q).

In a third step 1003, divide the tones into disjoint but preferably interleaved carrier groups $CG_1$ to $CG_M$ assigned to the subsets $SL_1$ to $SL_M$ respectively.

In a fourth step 1004, insert crosstalk probing signals in parallel for the respective subsets of disturber lines $SL_1$ to $SL_M$. The insertion of the crosstalk probing signals is frequency-confined within the respective carrier groups, i.e. within the carrier group $CG_1$ for disturber lines of the subset $SL_1$, within the carrier group $CG_2$ for disturber lines of the subset $SL_2$, and so on.

In a fifth step 1005, obtain crosstalk measurements from the victim receiver while crosstalk probing signals are being inserted.

In a sixth step 1006, obtain crosstalk estimates from the disturber lines in the subset $SL_1$ towards the victim line on tones in $CG_1$ in time proportional to the size of the subset $SL_1$, from the disturber lines in the subset $SL_2$ towards the victim line on tones in $CG_2$ in time proportional to the size of the subset $SL_2$, and so on; extend estimation using interpolation and/or denoising to the rest of the tones. Optionally, use part or all of these new crosstalk estimates for updating the precoder or postcoder.

In a seventh step 1007, determine crosstalk characteristics for the respective disturber lines, such as the frequency coherence of the crosstalk channels, the most dominant disturber lines for the given victim line, etc.

In a eighth step 1008, decide whether more measurement points are needed for one or more disturber lines out of the Q disturber lines. If so then proceed with the next step, else exit the algorithm.

In a ninth step 1009, and based on the crosstalk observations during step 1007, adjust the number Q of disturber lines selected for further crosstalk characterization, and/or the number M of subsets of disturber lines, and/or the respective composition of the subsets $SL_1$ to $SL_M$, and/or the respective composition of the carrier groups $CG_1$ to $CG_M$; and reiterate through the steps 1004 to 1008 with the newly determined subsets of disturber lines and/or the newly determined carrier groups until the crosstalk coefficients are adequately estimated.

For example, one or more difficult lines with rapid crosstalk variations across frequency and/or strong crosstalk are grouped in a first subset that is assigned a large closely-spaced carrier group, and similarly easy lines with slow crosstalk variations across frequency and/or weak crosstalk are grouped in a second subset that is assigned a small widely-spaced carrier group.

The subsets of disturber lines and/or the carrier groups can also be tailored based on the residual crosstalk. So, for example, disturbers whose crosstalk has already been adequately suppressed in previous iterations do not need to be included in any subset, and so the size of the subsets can be decreased and/or the number of tones in the carrier group can be increased.

Since crosstalk acquisition is now done in parallel, the time required is proportional to the maximum size of the subsets $SL_1$ to $SL_M$, which, if designed properly, should be much less than N−1 (typically (N−1)/M).

Optionally, the first iteration may use a frequency spacing much larger than the frequency coherence of a typical crosstalk channel. In this case the estimates are not accurate enough to get close to full vectored performance, but this is not the purpose. The purpose is rather to quickly distinguish disturbers that are significant from those which have no significant crosstalk. Then, in one or more subsequent iterations, the significant disturbers are targeted and estimated precisely with smaller frequency spacing. So there is a fast yet rough determination step, followed by a targeted precise estimation step.

Let F1 denote a typical frequency coherence of a typical crosstalk channel expressed in tones (coherence across F1 tones), i.e. how far can one interpolate and still get very precise estimates hence full vectored performance; let F2 denote a secondary frequency coherence, i.e. how far can one subsample and still detect whether a line is a significant disturber or not; let D denote the number of significant disturbers out of the N−1 potential disturbers (e.g., those in the same binder as the given victim line). Typically, we have F1<<F2 and D<<N−1.

The time required using F1 as default decimation factor is T0=N/F1. In the new approach, the time required is T1=N/F2 for the first iteration, plus T2=D/F1 for the second iteration. Typically T2<<T0 assuming F2>>F1. Typically T1<<T0 assuming D<<N. Hence T1+T2<<T0.

The proposed crosstalk acquisition algorithm 1000 may be used during initial start-up procedures, or for crosstalk tracking, or for rapidly reacting when changes in crosstalk occur for one or more vectored lines.

Figure 3:
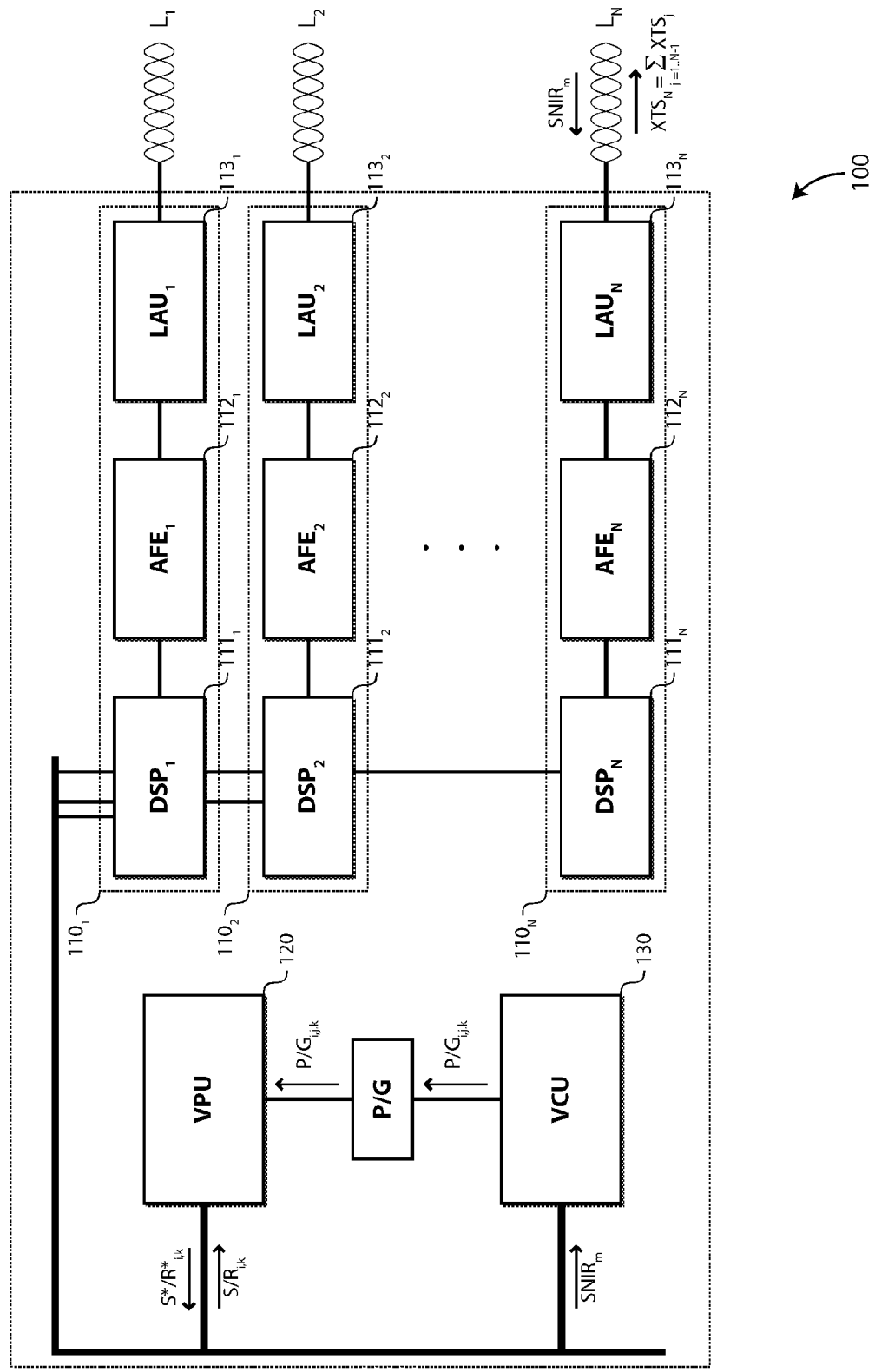
FIG. 3 represents a DSLAM as per the present invention.

FIG. 3 provides further details about the DSLAM 100.

The DSLAM 100 comprises the following functional blocks:
- the N transceivers 110;
- a Vectoring Processing Unit 120 (or VPU); and
- a vectoring Control Unit 130 (or VCU) for controlling the operation of the VPU 120.

Each one of the transceivers 110 is coupled to the VPU 120 and to the VCU 130. The VCU 130 is further coupled to the VPU 120.

The VPU 120 and the VCU 130 can be co-located with the transceivers 110 on a single Line Termination (LT) board for board level vectoring, or can form part of a dedicated Printed Board Assembly (PBA) for system level vectoring.

Each one of the transceivers 110 comprises:
- a Digital Signal Processor (DSP) 111,
- an Analog Front End (AFE) 112, and
- a Line Adaptation Unit (LAU) 113.

The N DSPs 111 are coupled to respective ones of the N AFE units 112. The N AFEs 112 are further coupled to respective ones of the N LAUs 113. The N LAUs 113 are further coupled to respective ones of the N lines $L_1$ to $L_N$.

Each one of the DSPs 111 is arranged to operate both a downstream and an upstream DSL communication channel.

Each one of the DSPs 111 is for encoding and modulating user and control data into digital data symbols, and for de-modulating and decoding user and control data from digital data symbols.

The following transmit steps are typically performed within the DSPs 111:
- data encoding, such as data multiplexing, framing, scrambling, error correction encoding and interleaving,
- signal modulation, comprising the steps of ordering the carriers according to a carrier ordering table, parsing the encoded bit stream according to the bit loadings of the ordered carriers, and mapping each chunk of bits onto an appropriate transmit constellation point (with respective carrier amplitude and phase), possibly with Trellis coding,
- signal scaling,
- Inverse Fast Fourier Transform (IFFT)
- Cyclic Prefix (cP) insertion, and
- time-windowing.

The following receive steps are typically performed within the DSPs 111:
- time-domain signal equalization,
- Cyclic Prefix (cP) removal,
- Fast Fourier Transform (FFT),
- frequency-domain signal equalization,
- signal de-modulation and detection, comprising the steps of applying to each and every equalized frequency sample an appropriate constellation grid, the pattern of which depends on the respective carrier bit loading, detecting the expected transmit constellation point and the corresponding transmit bit sequence, possibly with Trellis decoding, and re-ordering all the detected chunks of bits according to the carrier ordering table,
- data decoding, such as data de-interleaving, RS decoding (byte errors, if any, are corrected at this stage), de-scrambling, frame delineation and de-multiplexing.

Each one of the DSPs 111 is further configured to operate an Embedded Overhead Channel (EOC) that is used to transport control and management messages, such as OLR commands and responses. The EOC data are multiplexed with the user data over the DSL channel.

Each one of the AFES 112 comprises a Digital-to-Analog Converter (DAC) and an Analog-to-Digital Converter (ADC), a transmit filter and a receive filter for confining the signal energy within the appropriate communication frequency bands while rejecting out-of-band interference, a line driver for amplifying the transmit signal and for driving the transmission line, and a Low Noise Amplifier (LNA) for amplifying the receive signal with as little noise as possible.

Each one of the LAUS 113 comprises a hybrid for coupling the transmitter output to the transmission line and the transmission line to the receiver input while achieving low transmitter-receiver coupling ratio (e.g., by means of echo cancellation techniques), further transmit and receive high-pass filters for filtering out any unwanted signals present in the POTS/ISDN frequency bands, impedance-matching circuitry for adapting to the characteristic impedance of the line, and isolation circuitry (typically a transformer).

Each one of the DSPS 111 is further configured to supply transmit frequency-domain samples to the VPU 120 before Inverse Fast Fourier Transform (IFFT) step for joint signal precoding, and to supply receive frequency-domain samples to the VPU 120 after Fast Fourier Transform (FFT) step for joint signal post-processing.

Each one of the DSPS 111 is further configured to receive corrected frequency-domain samples from the VPU 120 for further transmission or detection. Alternatively, the DSPS 111 may receive correction samples to add to the initial frequency-domain samples before further transmission or detection.

The VPU 120 is configured to mitigate the crosstalk induced over the transmission lines $L_1$ to $L_N$. This is achieved by multiplying a vector S of transmit frequency-domain samples with a precoding matrix P so as to compensate for an estimate of the coming crosstalk (downstream), or by multiplying a vector R of receive frequency-domain samples with a crosstalk cancellation matrix G so as to cancel an estimate of the incurred crosstalk (upstream).

Let i and j denote line indexes ranging from 1 to N, k a frequency index, and l a Discrete Multi-Tone (DMT) symbol index.

Let $S_{i,k}^l$ and $S^*{}_{i,k}^l$ denote the transmit frequency-domain samples transmitted over line $L_i$ during DMT symbol l before and after crosstalk pre-compensation by the VPU 121 respectively.

Similarly, let $R_{i,k}^l$ and $R^*{}_{i,k}^l$ denote the receive frequency-domain samples received from line $L_i$ during DMT symbol l before and after crosstalk cancellation respectively.

We have:

$$S_k^{*l} = \begin{bmatrix} S_{1,k}^{*l} \\ S_{2,k}^{*l} \\ \vdots \\ S_{N,k}^{*l} \end{bmatrix} \quad (2)$$

$$= P_k \cdot S_k^l$$

$$= \begin{bmatrix} 1 & P_{1,2,k} & \cdots & P_{1,N,k} \\ P_{2,1,k} & 1 & & \vdots \\ \vdots & & & P_{N-1,N,k} \\ P_{N,1,k} & \cdots & P_{N,N-1,k} & 1 \end{bmatrix} \cdot \begin{bmatrix} S_{1,k}^l \\ S_{2,k}^l \\ \vdots \\ S_{N,k}^l \end{bmatrix},$$

and

-continued $$R_k^{*l} = \begin{bmatrix} R_{1,k}^{*l} \\ R_{2,k}^{*l} \\ \vdots \\ R_{N,k}^{*l} \end{bmatrix}$$

$$= G_k \cdot R_k^l$$

$$= \begin{bmatrix} 1 & G_{1,2,k} & \cdots & G_{1,N,k} \\ G_{2,1,k} & 1 & & \vdots \\ \vdots & & & G_{N-1,N,k} \\ G_{N,1,k} & \cdots & G_{N,N-1,k} & 1 \end{bmatrix} \cdot \begin{bmatrix} R_{1,k}^l \\ R_{2,k}^l \\ \vdots \\ R_{N,k}^l \end{bmatrix}. \quad (3)$$

In the matrix P or G, a row i represents a particular victim line $L_i$, while a column j represents a particular disturber line $L_j$. At the intersection, the coupling coefficient that should be applied to the corresponding disturber transmit or receive frequency-domain sample for mitigating over the victim line $L_i$ the crosstalk from the disturber line $L_j$. Not all the coefficients of the matrix need to be determined, for instance on account of limited vectoring capabilities first assigned to the strongest crosstalkers, or still for instance due to the fact that some lines do not noticeably interact with each other. The undetermined coefficients are preferably set to 0.

The VCU 130 is basically for controlling the operation of the VPU 120, and more specifically for estimating or updating the crosstalk coefficients between vectored lines, and for initializing or updating the precoding matrix P and the crosstalk cancellation matrix G from the so-estimated crosstalk coefficients.

Presently, the VCU 130 makes use of the SNIR method for estimating or updating the crosstalk coefficients. The VCU 130 gathers SNIR measurements carried out over a particular victim line, say line $L_N$, while weighted replicas of regular signals transmitted over the disturber lines, say lines $L_1$ to $L_{N-1}$, are being superimposed over the regular signal transmitted over the victim line.

For instance, the line $L_N$ may be a legacy line that is being initialized and further brought into service, while the lines $L_1$ to $L_{N-1}$ are active lines in showtime mode. The crosstalk coefficients from and toward the initializing line $L_N$ need to be estimated first before the crosstalk from and toward that line can be mitigated.

The description will now focus on crosstalk acquisition from the disturber lines $L_1$ to $L_{N-1}$ towards the victim line $L_N$ for downstream communication.

In a first step, the VCU 130 splits the whole set of disturber lines $L_1$ to $L_{N-1}$ (Q=N−1) into M subsets of disturber lines $SL_1$ to $SL_M$ comprising one or more disturber lines (2≤M≤N−1). The subsets $SL_1$ to $SL_M$ do not necessarily comprise an equal number of disturber lines.

The VCU 130 next assigns disjoint sets $CG_1$ to $CG_M$ of downstream carriers to the subsets $SL_1$ to $SL_M$ respectively. The carrier assignment algorithm shall take due account of the measured SNIR granularity that is enforced by the SNIR measurements and reporting primitives.

Typically, SNIR is measured and averaged over multiple contiguous carriers and over successive DMT symbols (typically 256). An SNIR carrier group, i.e. a carrier group for which only a single measured SNIR value is available, may comprise 1, 2, 4 or 8 contiguous carriers, depending on the transmission profile being used and the maximum carrier index being supported.

The VCU 130 first determines the SNIR downstream carrier groups based on the maximum carrier index being supported. Next, the VCU 130 discards any SNIR downstream carrier groups, a carrier of which is not a member of the downstream MEDLEY set, i.e. the overall set of active downstream carriers that are used for downstream communication, as SNIR is not expected to be reported for those groups. Finally, the VCU 130 assigns the remaining SNIR carrier groups to the respective subsets $SL_1$ to $SL_M$.

Let $\Gamma$ denote the overall number of valid SNIR downstream carrier groups, and let $SCG_n$ denote the nth valid SNIR downstream carrier group (1≤n≤$\Gamma$).

For a first initial crosstalk acquisition, the set $CG_m$ of downstream carriers assigned to a particular subset $SL_m$ (1≤m≤M) could be determined as follows:

$$CG_m = \bigcup_n SCG_n, \quad (4)$$

with $n = m + \lambda \cdot M,$ $0 \leq \lambda \leq \Omega - 1,$ $\Omega = \lfloor \Gamma / M \rfloor$ For instance, if SNIR measurements were averaged over two carriers, carriers would be pair-wise assigned to the respective subsets of disturber lines, say carrier pair {k; k+1} to the first subset, carrier pair {k+2; k+3} to the second subset, and so on.

The remaining SNIR downstream carrier groups $SCG_{\Omega \cdot M+1}$ to $SCG_\Gamma$, if any, are evenly distributed to selected subsets of disturber lines in a fixed, arbitrary or random manner.

This initial carrier assignment applies a common decimation (or sub-sampling) factor to all the carrier groups, presently the number M of subsets of disturber lines, and achieves an almost-identical inter-carrier spacing pattern, thereby allowing a very first characterization of the crosstalk channels.

Subsequently, and depending on the smoothness and/or strength of the crosstalk estimates, different decimation factors could be applied to the respective subsets of disturber lines.

In a second step, crosstalk probing signals are being superimposed on the regular downstream signal transmitted over the victim line.

The crosstalk probing signal for estimating the crosstalk coefficients from a given disturber line $L_j$ toward a given victim line $L_i$ is a weighted replica of the regular downstream signal transmitted over the disturber line $L_j$, and is superimposed over the victim line $L_i$. The crosstalk probing signal additively or destructively interfere with the actual crosstalk signal from the disturber line $L_j$ depending on the chosen weight values and the crosstalk coupling function.

Also, the VCU 130 confines the insertion of the crosstalk probing signals to the respective carrier groups, meaning that, at a particular frequency index k∈$CG_m$, the VCU 130 inserts one or more probing signals for one or more disturber lines that belong to the subset $SL_m$, and does not insert any probing signal for the disturber lines that do not belong to the subset $SL_m$.

Thus, we have:

$$XTS_{i,k}^l = \sum_{j \neq i} \alpha_{j,k} \cdot S_{j,k}^l, \quad (5)$$

wherein $XTS_{i,k}^l$ denotes the k-th frequency sample of the overall crosstalk probing signal superimposed on the victim line $L_i$ during DMT symbol l, and $\alpha_{j,k}$ denotes a complex weight value used for the disturber line $L_j$ on tone k, and wherein $\alpha_{j,k}=\alpha_j$ (6a) for $k \in CG_m$ and for a disturber line $L_j \in SL_m$, and $\alpha_{j,k}=0$ (6b) for $k \in CG_m$ and for a disturber line $L_j \notin SL_m$.

Equations (6a) and (6b) ensure that the crosstalk probing signals for the respective disturber lines are frequency-confined within the respective carrier groups. This non-overlapping frequency-interleaved signal insertion allows parallel and fast acquisition of crosstalk coefficients from multiple disturber lines.

Three successive SNIR measurement rounds with three distinct complex weight values are required for estimating both the amplitude and phase of the crosstalk coefficients from a given disturber line. Typically, $\alpha_j=0$ (i.e., no crosstalk probing signal is inserted; this base SNIR measurement can be performed prior to or after the insertion of the crosstalk probing signals), $\alpha_j=\epsilon$ (i.e., a scaled replica of the regular data signal is inserted), and $\alpha_j=j\epsilon$ (i.e., a scaled quadrature replica of the regular data signal is inserted) for the three respective measurement rounds. A suitable value for is chosen such that the impact on the SNR is measurable but not excessive (typically no more than 3 dB SNIR variation at the victim receiver).

If a subset $SL_m$ comprises more than one disturber line, then the corresponding crosstalk probing signals may be sent sequentially one after the other (e.g., as per Appendix III.2 of G.993.5 ITU recommendation), meaning a total of $1+2\cdot size(SL_m)$ observations are required for acquiring the crosstalk coefficients from this subset of disturber lines, or the crosstalk probing signals may be combined all together with respective weight values $\{\alpha_j\}_{Lj \in SLm}$ (e.g., as per Appendix III.3 of G.993.5 ITU recommendation). Yet, linearly-independent weight values are required so as to get a set of linearly-independent equations that can be solved, meaning still a total of $1+2\cdot size(SL_m)$ observations.

The superimposition of the crosstalk probing signals can be easily achieved by adding the weight values $\alpha_{j,k}$ to the respective coefficients $P_{i,j,k}$, $j \neq i$ of the precoder matrix P.

Initially, when a new joining line $L_i$ joins an existing vectoring group, the off-diagonal elements of the i-th row of the precoding matrix P are all null as the crosstalk channels toward that new joining line $L_i$ have not been characterized yet. So are the off-diagonal elements of the i-th column as the crosstalk channels from that new joining line $L_i$ have not been characterized yet.

A first SNIR measurement round now takes place while first weight values $\alpha_{j,k}^{(1)}=\epsilon^{(1)}/j\epsilon^{(1)}$ are added to the current matrix coefficients values $P_{i,j,k}$, $j \neq i$: $P_{i,j,k}^{(1)}=\alpha_{j,k}^{(1)}$.

Next, the values of the matrix coefficients $P_{i,j}^{(1)}$ are determined from the first rough estimates of the crosstalk coefficients, and the VPU 120 starts canceling a part of the crosstalk induced over the victim line $L_i$. Yet, some residual crosstalk remains owing to the crosstalk estimation errors and SNIR measurement inaccuracies.

A new SNIR measurement round now takes place while new weight values $\alpha_{j,k}^{(2)}=\epsilon^{(2)}/j\epsilon^{(2)}$ are added to the current matrix coefficients values $P_{i,j,k}$, $j \neq i$: $P_{i,j,k}^{(2)}=P_{i,j,k}^{(1)}+\alpha_{j,k}^{(2)}$.

The value $\epsilon^{(2)}$ used for that second measurement round is typically lower than the value $\epsilon^{(1)}$ that was used during the first measurement round as part of the crosstalk is already canceled. The process re-iterates till the residual crosstalk power is below a pre-determined relative or absolute threshold.

In a third step, the vCU 130 instructs the corresponding transceiver 110, namely the transceiver $110_N$, to fetch SNIR measurement values from the victim CPE, namely the CPE $200_N$, while the crosstalk probing signals are being superimposed on the victim line $L_N$.

Thereupon, the transceiver $110_N$ sends multiple PMD READ commands to read the SNIR values as measured by the CPE $200_N$. Typically, a single PMD READ command reads a single SNIR value $SNIR_n$ as averaged over a particular SNIR downstream carrier group $SCG_n$ and over successive DMT symbols. The SNIR values for all the SNIR downstream carrier groups are read sequentially while a single weight value is in force. Next, the weight values are adjusted, and the process re-iterates.

In a fourth step, the VCU 130 estimates the crosstalk coefficient values from the measured SNIR values as set forth in Appendix III of G.993.5 ITU recommendation, the content of which is entirely incorporated therein.

The missing crosstalk coefficients at intermediary frequency indexes are determined by means of interpolation. Denoising techniques may also be involved.

Optionally, the vCU 130 proceeds with the computation or update of the precoding matrix P from the new crosstalk estimates. The VCU 130 can use a first-order matrix inversion to compute the coefficients of the precoding matrix P, or any other suitable method.

The VCU 130 is further configured to quantify the variation across frequency of the crosstalk coefficients (both phase and amplitude), which is indicative of the frequency coherence of the crosstalk channel. The VCU 130 sorts the disturber lines based on the frequency coherence of the respective crosstalk channels. The VCU 130 may further sort the disturber lines based on the magnitude of the respective crosstalk coefficients, which is indicative of the amount of crosstalk impairment induced over the victim line.

Based on the smoothness and/or magnitudes of the crosstalk coefficients, the vCU 130 adjusts the number M of subsets of disturber lines, and/or re-arranges the disturber lines into different subsets, and/or adjusts the decimation factors of the respective carrier groups as well as the dispatching of the downstream SNIR carrier groups to the respective carrier groups. The VCU 130 may also de-select disturber lines that do not (or no longer) noticeably interact with the victim line.

The VCU 130 next re-iterates through the second, third and fourth steps with the newly determined subsets of disturber lines and respective carrier groups until the crosstalk estimates converge.

It can be seen that the algorithm uses parallel rather than successive measurements, and that, after an initial sensing phases, the algorithm tailors the measurements and tone groups such that they focus on the dominant crosstalker(s) and further interpolation and denoising.

If any a priori information is available on the relative crosstalk strength and/or smoothness for some of the disturber lines, then the initial sensing phase can be skipped.

Crosstalk compensation can start at and around the measured tones (possibly with an attenuation to limit the effect of estimation errors). Depending on the smoothness of the channel, crosstalk over a smaller or larger region around the measured tone groups can be compensated. As soon as more measurements become available, a combination of interpolation and denoising is used to improve the crosstalk estimates and to adjust compensation.

For the purpose of interpolation and denoising, weighting may further be used to reduce the impact of measurement errors in the initial measurements.

For mixed vectored and legacy systems, the algorithm can reduce the convergence time of an activating line significantly, as well as the computational complexity of the crosstalk estimation algorithm.

In an alternative embodiment, and still making use of SNIR measurements over the victim line, a crosstalk probing signal is superimposed over each disturber line. The crosstalk probing signal is a weighted replica of the regular signal transmitted over the victim line. The crosstalk probing signals couples into the victim line through the crosstalk channels, and additively or destructively interfere with the direct victim signal depending on the chosen weight values and the crosstalk coupling function. Yet, this method is less preferred as the power of the crosstalk probing signal needs to be substantially increased to achieve the same estimation accuracy, which may severely impair the direct communication over the disturber lines.

In an alternative embodiment, a particular orthogonal pilot sequences assigned to a particular disturber line $L_j$ modulates the carriers of the disjoint carrier groups $CG_m$ assigned to the subset $SL_m$ to which the subscriber line $L_j$ belongs. The remaining carriers that are not member of the carrier group $CG_m$ remain unmodulated, or may carry the SYNC-FLAG information. The resulting crosstalk probing signal is then transmitted over the disturber line $L_j$ during dedicated transmission slots, such as during the SYNC symbols.

Multiple disturber lines may use the same orthogonal pilot sequence, yet this orthogonal pilot sequence will only modulate disjoint groups of carriers over the respective disturber lines.

Slicer errors are measured over the victim line and correlated with the pilot sequence of a given disturber line so as to isolate the crosstalk contribution from that disturber line.

Figure 4:
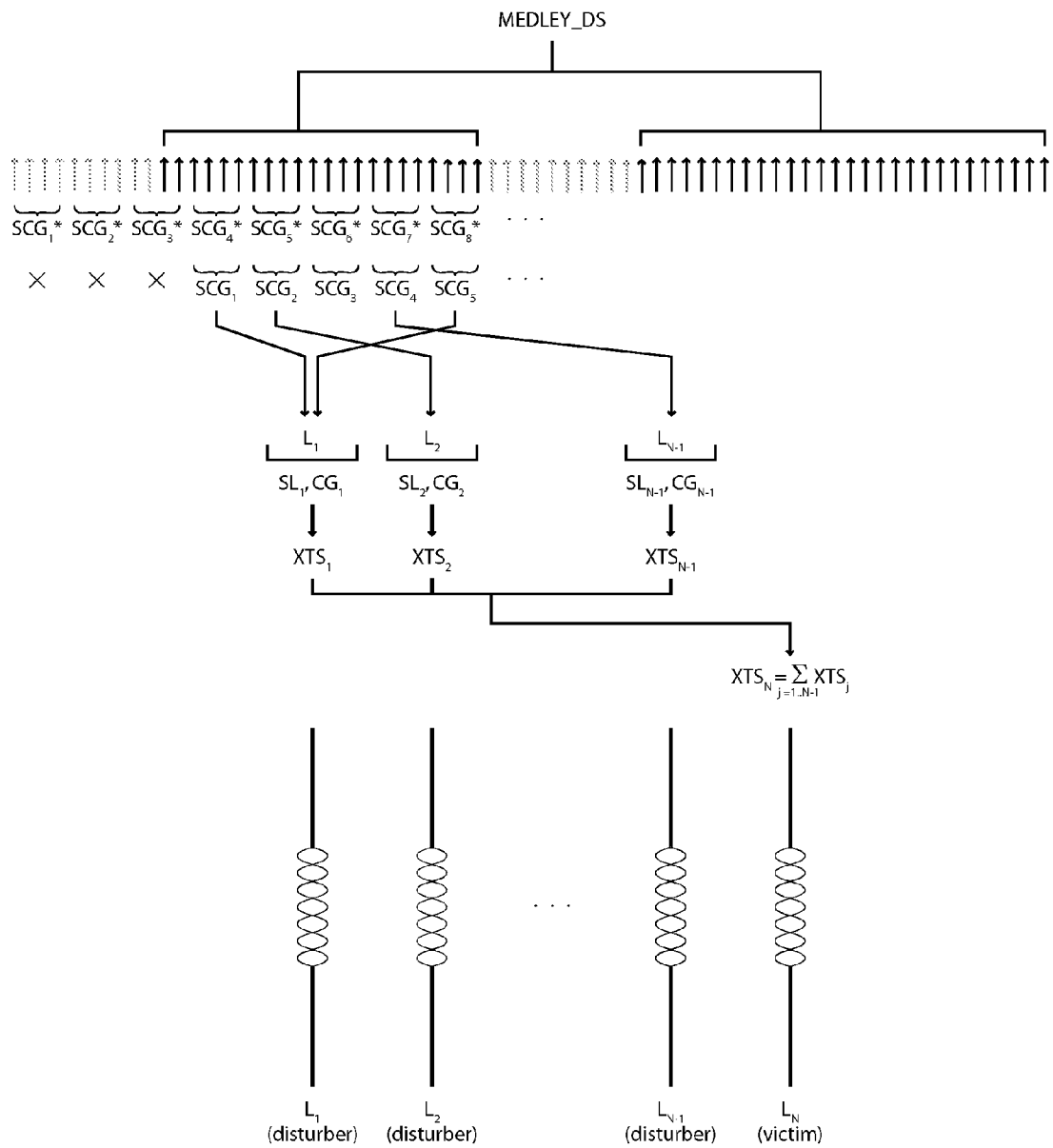
FIG. 4 represents an exemplary assignment of downstream carriers to the respective disturber lines.

There is seen in FIG. 4 a pictorial view of an exemplary assignment of downstream carriers to the respective disturber lines as per the present invention.

First of all, the communication carriers are split into SNIR carrier groups according to the selected transmission profile. An SNIR carrier group comprise $\Delta$ contiguous carriers ($\Delta=4$ in FIG. 4). Let $SCG_n^*$ denotes those initial SNIR carrier groups:

$$SCG_n^* = \{(n \times \Delta); (n \times \Delta)+1; \ldots ; ((n+1) \times \Delta)-1\} \quad (7)$$

Next, the SNIR carrier groups are intersected with the downstream MEDLEY set MEDLEY_DS, and any SNIR carrier group that remains unchanged after this intersect operation is kept, while the ones that do not are discarded. The remaining valid SNIR carrier groups are denoted as $SCG_n$ and are renumbered from 1 to $\Gamma$.

Next, the N−1 disturber lines $L_1$ to $L_{N-1}$ are organized into M subsets $SL_1$ to $SL_M$ (presently M=N−1), and the $\Gamma$ SNIR downstream carrier groups $SCG_n$ are individually and evenly dispatched toward the M subsets $SL_1$ to $SL_M$, thereby yielding disjoint and interleaved set of downstream carriers groups $CG_1$ to $CG_M$ for parallel crosstalk acquisition.

Within each carrier group $CG_m$, the inter-carrier spacing between contiguous SNIR carrier groups is typically equal to $(N-2) \cdot \Delta$ (with some discontinuities at the frequency gaps of the transmission profile, if any).

A crosstalk probing signal $XTS_j$ is inserted over the victim line $L_N$ for characterizing the crosstalk channel from a given disturber line $L_j$, j≠N. The crosstalk probing signal $XTS_j$ only modulates the carriers of the particular carrier group $CG_m$ assigned to the subset $SL_m$ to which the particular disturber line $L_j$ belongs.

The crosstalk probing signals $XTS_j$, j≠N are then frequency-combined into one single crosstalk probing signal $$XTS_N = \sum_{j=1\ldots N-1} XTS_j$$

that is superimposed over the regular signal transmitted over the victim line $L_N$.

The induced SNIR changes are detected and measured at the victim CPE $200_N$, and a single average SNIR value $SNIR_n$ is computed for each and every SNIR downstream carrier group $SCG_n$. The average SNIR values $SNIR_n$ are reported back to the DSLAM 100 for characterization of the crosstalk channels.

Figure 5:
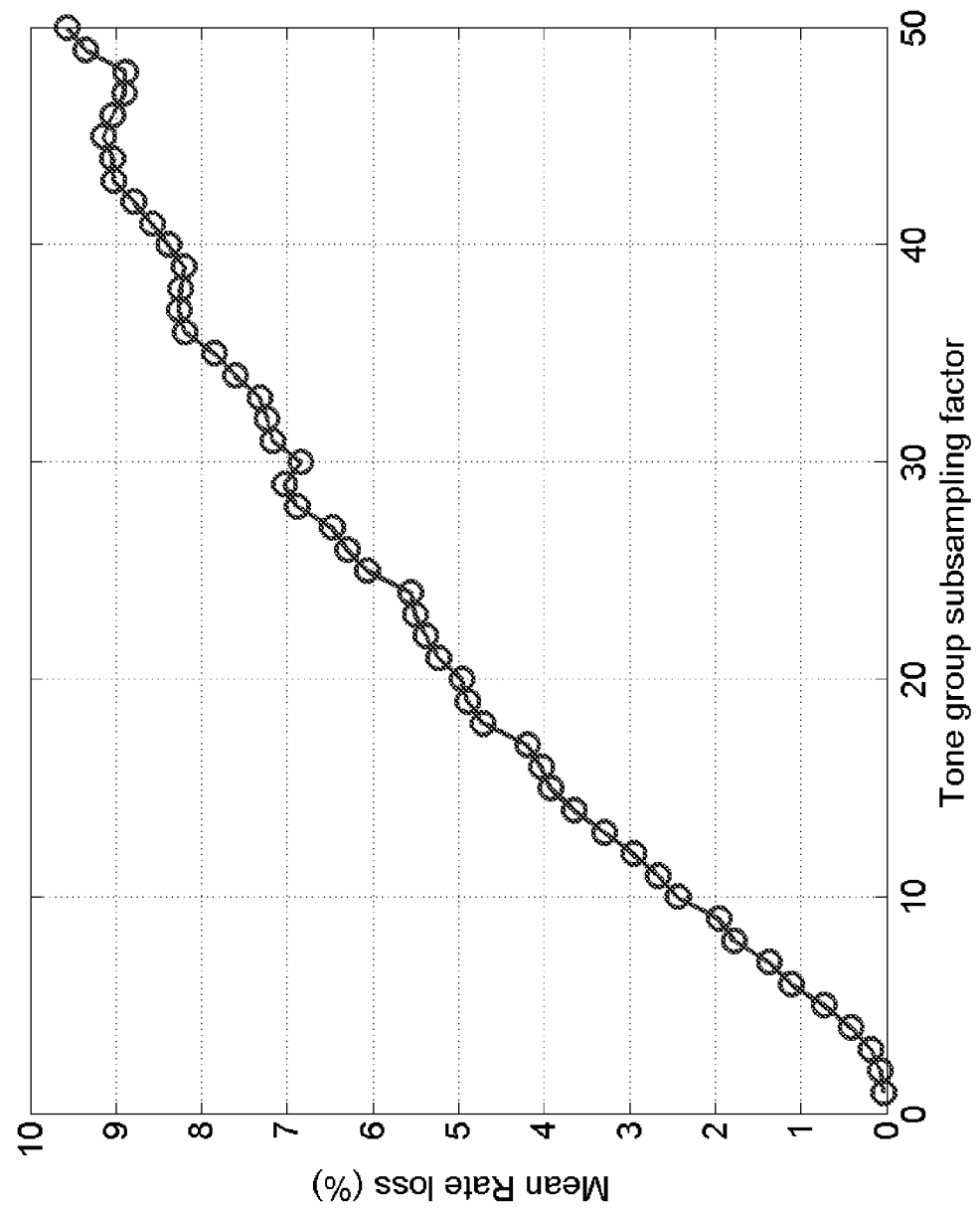
FIG. 5 represents a plot of the mean rate loss as a function of the carrier group decimation factor.

FIG. 5 shows a plot of the mean rate loss versus the carrier group sub-sampling factor for a DSL system with eight subscriber lines: the more sub-sampling, the more inter-carrier spacing, the less accurate the interpolation, the more residual crosstalk, and thus the more rate loss compared to the nominal rate figures without any decimation. Yet, even for a very basic interleaving scheme, the rate-loss penalty is relatively low for sufficient smooth crosstalk channels.

Although the above description mostly focuses on acquisition of downstream crosstalk coefficients, it equally applies to the acquisition of upstream crosstalk coefficients.

For instance, the crosstalk probing signals that are used for estimating the upstream crosstalk coefficients are weighted replicas of the receive signal samples from the respective disturber lines, and are superimposed over the receive signal samples from the victim line by appropriately adjusting the coefficients of the crosstalk cancellation matrix G.

The VCU 130 assigns disjoint sets of upstream carriers to the disturber lines. The upstream carriers are chosen from the upstream MEDLEY set. The SNIR is now measured by the transceiver $110_N$, and directly made available to the VCU 130 for upstream crosstalk estimation.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice versa. It means that there exists a path between an output of A and an input of B, and/or vice versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (Rom), random access memory (RAM), and non volatile storage, may also be included.

The invention claimed is:

1. A method for acquiring crosstalk coefficients from a plurality of disturber lines into a victim line in a wired multi-carrier communication system, the method comprising iteratively performing:
    inserting a plurality of crosstalk probing signals within the wired multi-carrier communication system for probing crosstalk from respective ones of the plurality of disturber lines into the victim line,
    carrying out crosstalk measurements over the victim line,
    estimating the crosstalk coefficients from the crosstalk measurements,
    organizing the plurality of disturber lines into subsets of disturber lines, and
    individually assigning disjoint groups of carriers to respective subsets of disturber lines, the insertion of the plurality of crosstalk probing signals being confined within the respectively assigned groups of carriers, wherein at least one of the subsets of disturber lines and the assigned groups of carriers used for a second or a subsequent iteration, is adjusted based on the crosstalk coefficients for respective disturber lines during a previous iteration.

2. The method according to claim 1, further comprising:
    determining an indication of a frequency coherence of respective crosstalk channels based on the crosstalk coefficients.

3. The method according to claim 1, further comprising:
    determining an indication of amounts of nominal crosstalk incurred from the respective disturber lines based on the crosstalk coefficients.

4. The method according to claim 1, further comprising:
    determining an indication of amounts of residual crosstalk incurred from the respective disturber lines that remain uncompensated over the victim line based on the crosstalk coefficients.

5. The method according to claim 1, wherein
    the individually assigning assigns interleaved groups of carriers with respective decimation factors to the subsets of disturber lines, and
    the respective decimation factors used for a first iteration are greater than a frequency coherence of a crosstalk channel.

6. The method according to claim 1, wherein the subsets of disturber lines include one or more disturber lines.

7. The method according to claim 1, wherein the estimating the crosstalk coefficients from one of the plurality of disturber lines into the victim line, comprises:
    obtaining respective crosstalk measurements carried out over the victim line at frequency indexes of a carrier group assigned to one of the subsets of disturber lines to which the disturber line belongs,
    estimating the crosstalk coefficients at the frequency indexes from the respective crosstalk measurements, and
    determining remaining crosstalk coefficients at the remaining ones of frequency indexes by means of interpolation.

8. The method according to claim 1, wherein the crosstalk measurements include Signal to Noise and Interference Ratio (SNIR) measurements.

9. The method according to claim 8, wherein
    the plurality of crosstalk probing signals are weighted replicas of a plurality of regular signals transmitted over, or received from, a respective one of the plurality of disturber lines, and
    the plurality of crosstalk probing signals are combined as a single crosstalk probing signal superimposed over a further regular signal transmitted over, or received from, the victim line.

10. The method according to claim 8, wherein
    the plurality of crosstalk probing signals are weighted replicas of a regular signal transmitted over, or received from the victim line, and
    the plurality of crosstalk probing signals are superimposed over respective ones of a plurality of further regular signals transmitted over, or received from, respective ones of the plurality of disturber lines.

11. The method according to claim 1, wherein the crosstalk measurements include slicer error measurements.

12. The method according to claim 11, further comprising:
    obtaining the plurality of crosstalk probing signals by modulating the carriers of the respective carrier groups with orthogonal probing sequences, and
    synchronously transmitting the plurality of crosstalk probing signals over respective ones of the plurality of disturber lines during at least one dedicated transmission.

13. A vectoring controller configured to acquire crosstalk coefficients from a plurality of disturber lines into a victim line in a wired multi-carrier communication system, the vectoring controller being configured to iteratively,
    insert a plurality of crosstalk probing signals for probing the crosstalk from respective ones of the plurality of disturber lines into the victim line,
    receive crosstalk measurements carried out over the victim line,
    estimate the crosstalk coefficients from the crosstalk measurements,
    organize the plurality of disturber lines into subsets of disturber lines,
    assign disjoint groups of carriers to respective subsets of disturber lines,
    confine the insertion of the plurality of crosstalk probing signals within the respectively assigned groups of carriers, and
    adjust at least one of the subsets of disturber lines and the assigned groups of carriers, used for a second or a subsequent iteration, based on the crosstalk coefficients for the respective disturber lines during a previous iteration.

14. A Digital Subscriber Line Access Multiplexer DSLAM comprising a vectoring controller according to claim 13.

\* \* \* \* \*